Patented Feb. 3, 1970

3,493,438
ELECTRIC STORAGE BATTERIES
John Derek Harris, Solihull, England, assignor to Joseph Lucas (Industries) Limited, Birmingham, England, a British company
Filed Feb. 21, 1967, Ser. No. 617,625
Claims priority, application Great Britain, Mar. 2, 1966, 9,108/66
Int. Cl. H01m 11/00
U.S. Cl. 136—162          5 Claims

ABSTRACT OF THE DISCLOSURE

A battery having a filling and venting device. The lid of the battery includes a recess having filling tubes and venting tubes extending therefrom into the cells of the battery respectively, there being provided a cover for closing the recess having integral therewith valve members for closing the venting tubes when the cover is raised from the battery lid to allow electrolyte to be poured into the recess.

---

This invention relates to electric storage batteries.

A battery according to the invention includes a lid, a filling recess in the lid communicating with filling tubes extending into the cells of the battery respectively, valve orifices in the lid communicating with the cells of the battery respectively, and through which the spaces below the lid can be vented, a cover which when in a first position on the lid closes the filling recess and which is movable to a second position to open the filling recess and valve members carried by the cover which extend through hte valve orifices respectively and which close the valve orifices when the cover is in said second position, the cover being moved to its second position when the battery is to be filled and the flow of electrolyte into a cell being halted as soon as the lower end of the respective filling tube is covered by the electrolyte in the cell, movement of the cover to its second position then venting the spaces below the lid so that the electrolyte in the filling tubes flows into the cells.

The arrangement specified in the preceding paragraph has the advantage that no valve means are necessary in the filling tubes themselves, moreover, in the preferred embodiment the valve means is connected to the cover and serves to provide connection between the cover and the lid when the closure members are withdrawn from the filling tubes, so preventing inadvertent loss of the cover.

Figure 1:
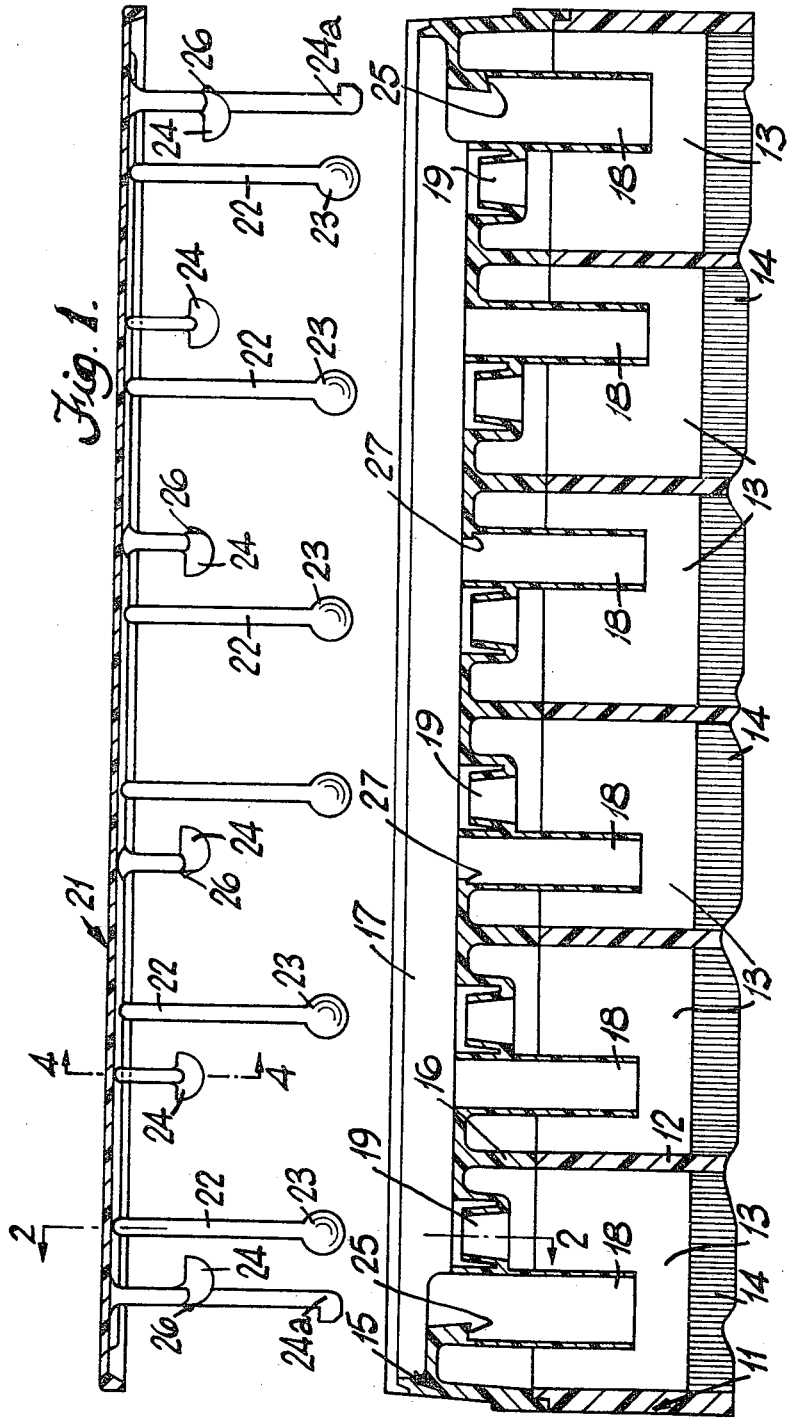
Figure 2:
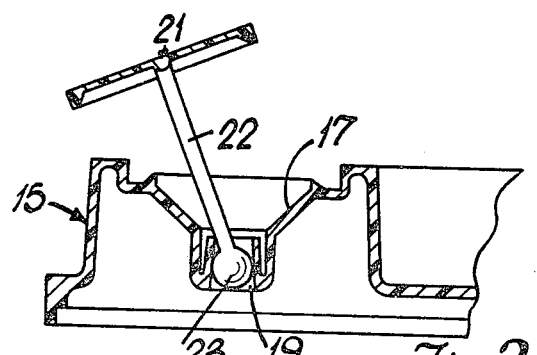
Figure 4:
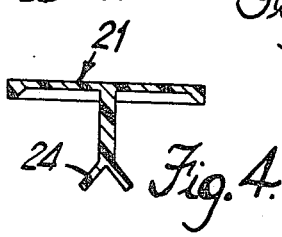
Figure 3:
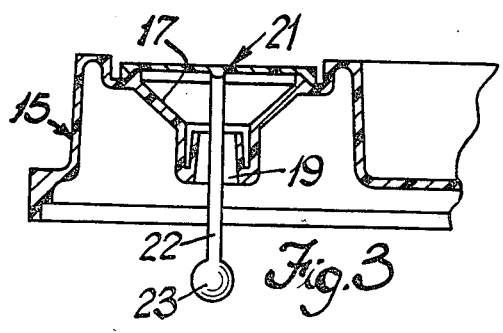

One example of the invention is illustrated in the accompanying drawings wherein FIGURE 1 is an exploded fragmentary sectional view of a battery, FIGURE 2 is a sectional view on the line 2—2 in FIGURE 1 but showing the cover in its open position and FIGURE 3 is a view similar to FIGURE 2 but showing the cover in its closed position, and FIGURE 4 is a sectional view on the line 4—4 in FIGURE 1.

Referring to the drawing the battery includes a box 11 divided by partition walls 12 into six cells 13. Each cell 13 contains a pack 14 of battery plates and separators, connections between the cells being made through the walls 12, and the plates in the end cells being connected to terminal posts. The box is closed by a lid 15 through which the terminal posts extend, the lid 15 having on its inner surface walls 16 which are secured to the tops of the partition walls.

In the lid 16 is a filling recess 17 from which six filling tubes 18 extend into the battery cells. Moreover, also extending from the recess 17 in close proximity to the tubes 18 are six shorter valve tubes 19 which also extend into the cells 13 respectively to define valve orifices. The tubes 19 are resilient and taper from a maximum diameter at their inner ends to a minimum diameter at their outer ends.

Engageable with the lid 15 is a cover 21 for closing the recess 17. Integral with the cover are six valve rods 22 which extend through the tubes 19 respectively, and are so shaped that when the cover 21 is in position to close the recess 17, the space in the battery box below the lid is vented to atmosphere via the tubes 19.

When it is desired to fill the battery, the cover 21 is raised to uncover the filling tubes 18. The lower ends of the valve rods 22 are formed with integral balls 23 which as the cover is raised engage and wedge in the tubes 19 and serve the dual purpose of closing the valves, and providing a pivotal connection for the cover 21, so that the cover 21 can be moved to one side without the risk of loss. Distilled water is then poured into the recess 17, and the arrangement is such that each cell is filled only until the lower end of its respective tube 18 is covered, at which point no more distilled water can enter the cell 13. Flling is continued until distilled water is just overflowing into the recess 17, and at this point the cover 21 is replaced, so that the tubes 18 are covered, and the balls 23 disengage from the tubes 19 to vent the space below the lid 15 to atmosphere, so that distilled water in the tubes 18 can enter the cells 13, it being appreciated that although the cover 21 closes the recess 17 it does not seal it.

Preferably, both the lid 15 and the cover 21 are moulded in synthetic resin.

The cover 21 further includes six downwardly extending baffles 24 which when the cover is in position on the lid 15 enter into the filling tubes 18 and prevent electrolyte from the cells 13 escaping into the recess 17 via the tubes 18. The first and sixth baffles 24 are extended to define a pair of catch members 24a, which when the cover is raised, engage under shoulders 25 formed in the walls of the two end filling tubes 18 to limit the amount by which the cover 21 can be raised from the lid 15. Furthermore, the first, third, fourth and sixth baffles 24 each include a resilient barbed latch member 26 which when the cover 21 is in position on the lid 15 engages under a shoulder 27 in the wall of its respective tube 18 and which, serve to prevent accidental dislodgement of the cover.

Having thus described by invention what I claim as new and desire to secure by Letters Patent is:

1. An electric storage battery including a lid, a filling recess in the lid communicating with filling tubes extending into the cells of the battery respectively, valve orifices in the lid communicating with the cells of the battery respectively, and through which the spaces below the lid can be vented, a cover which when in a first position on the lid closes the filling recess and which is movable to a second position to open the filling recess and valve members carried by the cover, said valve members comprising rods which extend through the valve orifices respectively and have at their free ends spherical portions which close the valve orifices when the cover is in said second position, the cover being moved to its second position when the battery is to be filled and the flow of electrolyte into a cell being halted as soon as the lower end of the respective filling tube is covered by the electrolyte in the cell, movement of the cover to its second position venting the spaces below the lid so that the electrolyte in the filling tubes flows into the cells.

2. A battery as claimed in claim 1 wherein the spherical end portions of the valve members serve when engaged with the valve orifices to form a pivotal connection between the cover and the lid.

3. A battery as claimed in claim 1 wherein the valve orifices are constituted by resilient tubes which taper from a maximum diameter at their inner ends to a minimum diameter at their outer ends.

4. A battery as claimed in claim 1 wherein the cover includes catch members which coact with the lid to limit the movement of the cover away from the lid.

5. A battery as claimed in claim 1 wherein the cover includes latch members which coact with the lid to locate the cover in its first position.

References Cited

UNITED STATES PATENTS

| 2,629,760 | 2/1953 | Wells et al. | 136—177 |
| 2,647,159 | 7/1953 | Lighton | 136—178 XR |

FOREIGN PATENTS

| 954,435 | 12/1956 | Germany. |
| 972,787 | 10/1964 | Great Britain. |

WINSTON A. DOUGLAS, Primary Examiner

D. L. WALTON, Assistant Examiner

U.S. Cl. X.R.

136—170, 177